(12) United States Patent
Bernhardt

(10) Patent No.: US 11,478,941 B2
(45) Date of Patent: Oct. 25, 2022

(54) END EFFECTORS AND METHODS FOR GRIPPING A CURVILINEAR SHEET OF MATERIAL

(71) Applicant: The Boeing Company, Chicago, IL (US)

(72) Inventor: Roger D. Bernhardt, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 918 days.

(21) Appl. No.: 16/282,065

(22) Filed: Feb. 21, 2019

(65) Prior Publication Data
US 2020/0269441 A1 Aug. 27, 2020

(51) Int. Cl.
*B65G 49/06* (2006.01)
*B25J 15/00* (2006.01)
*B25J 15/02* (2006.01)

(52) U.S. Cl.
CPC ....... *B25J 15/0042* (2013.01); *B25J 15/0253* (2013.01); *B65G 49/067* (2013.01); *B25J 15/0019* (2013.01)

(58) Field of Classification Search
CPC ............... B25J 15/0019; B25J 15/0042; B25J 15/0253; B65G 49/067
See application file for complete search history.

(56) References Cited

U.S. PATENT DOCUMENTS

| 5,156,225 A | 10/1992 | Murrin | |
|---|---|---|---|
| 2009/0072441 A1* | 3/2009 | Bracke | B31D 3/0284 264/271.1 |
| 2010/0156127 A1* | 6/2010 | De Kervanoael | B25J 15/0253 901/46 |

OTHER PUBLICATIONS

Zhang et al., "Multifunctional structural lithium-ion battery for electric vehicles," Journal of Intelligent Material Systems and Structures, vol. 28(12), 1603-1613, 2017.
(Continued)

*Primary Examiner* — Saul Rodriguez
*Assistant Examiner* — Brendan P Tighe
(74) *Attorney, Agent, or Firm* — Dascenzo Gates Intellectual Property Law, P.C.

(57) ABSTRACT

End effectors and methods for gripping a curvilinear sheet of material are disclosed herein. The curvilinear sheet of material defines a first sheet side having a curvilinear first side topography and a second sheet side having a curvilinear second side topography. The end effector includes a negative mating shaped first sheet-engaging surface configured to operatively support the first sheet side and having a curvilinear first sheet-engaging surface topography that corresponds to the curvilinear first side topography. The end effector also includes a second sheet-engaging surface configured to operatively support the second sheet side and having a curvilinear appropriately mating negative shaped second sheet-engaging surface topography that corresponds to the curvilinear second side topography. The end effector further includes an actuation mechanism configured to selectively transition the end effector between an open orientation and a gripping (converging) orientation. The methods include methods of utilizing the end effectors.

19 Claims, 3 Drawing Sheets

(56) References Cited

OTHER PUBLICATIONS

Abstract for Thomas et al., "Multifunctional Structure-Battery Materials for Enhanced Performance in Small Unmanned Air Vehicles," The American Society of Mechanical Engineers, ASME 2003 International Mechanical Engineering Congress and Exposition, Nov. 15-21, 2003.

Asp et al., "Realisation of Structural Battery Composite Materials," 20th International Conference on Composite Materials, Copenhagen, Jul. 19-24, 2015.

Ritzert et al., "Structural Batteries for Hybrid Electric Propulsion System," NASA Aeronautics Research Institute, Jul. 10, 2013.

Thomas et al., "The Design and Application of Multifunctional Structure-Battery Materials Systems," JOM, 18-24, Mar. 2005.

* cited by examiner

END EFFECTORS AND METHODS FOR GRIPPING A CURVILINEAR SHEET OF MATERIAL

FIELD

The present disclosure relates generally to end effectors and methods for gripping a curvilinear sheet of material.

BACKGROUND

End effectors may be utilized to hold and/or grip an object. When the object is durable and/or rigid, the end effector may be unlikely to deform and/or damage the object. However, if the object is soft, thin, brittle, and/or fragile, the end effector may deform, crush, tear, and/or otherwise damage the object. As an example, uncured and/or partially hardened printed or composite parts, including composite sheets and/or films, may be too soft and/or fragile to handle and/or transfer utilizing standardized tools with conventional end effector technology. Thus, there exists a need for improved real time customized end effectors as a method for gripping curvilinear material shapes such as sheets or blocks.

SUMMARY

End effectors and methods for gripping a curvilinear sheet of material are disclosed herein. The curvilinear sheet of material defines a first sheet side having a curvilinear first side topography and a second sheet side having a curvilinear second side topography. The end effector includes a first sheet-engaging surface configured to operatively support the first sheet side and having a curvilinear first sheet-engaging surface topography that corresponds to the curvilinear first side topography. The end effector also includes a second sheet-engaging surface configured to operatively support the second sheet side and having a curvilinear second sheet-engaging surface topography that corresponds to the curvilinear second side topography. The end effector further includes an actuation mechanism configured to selectively transition the end effector between an open orientation and a gripping orientation. When in the open orientation, the end effector is configured to permit the curvilinear sheet of material to be positioned between the first sheet-engaging surface and the second sheet-engaging surface. When in the gripping orientation, the end effector is configured to grip the curvilinear sheet of material between the first sheet-engaging surface and the second sheet-engaging surface.

The methods include methods of gripping a curvilinear sheet of material with an end effector. The methods include positioning, while the end effector is in an open orientation, the curvilinear sheet of material between a first sheet-engaging surface of the end effector and a second sheet-engaging surface of the end effector. The methods also include aligning a curvilinear first side topography of the curvilinear sheet of material with a curvilinear first sheet-engaging surface topography of the first sheet-engaging surface. The methods further include transitioning the end effector from the open orientation to a gripping orientation to grip the curvilinear sheet of material between the first sheet-engaging surface and the second sheet-engaging surface.

DESCRIPTION

Figure 1:
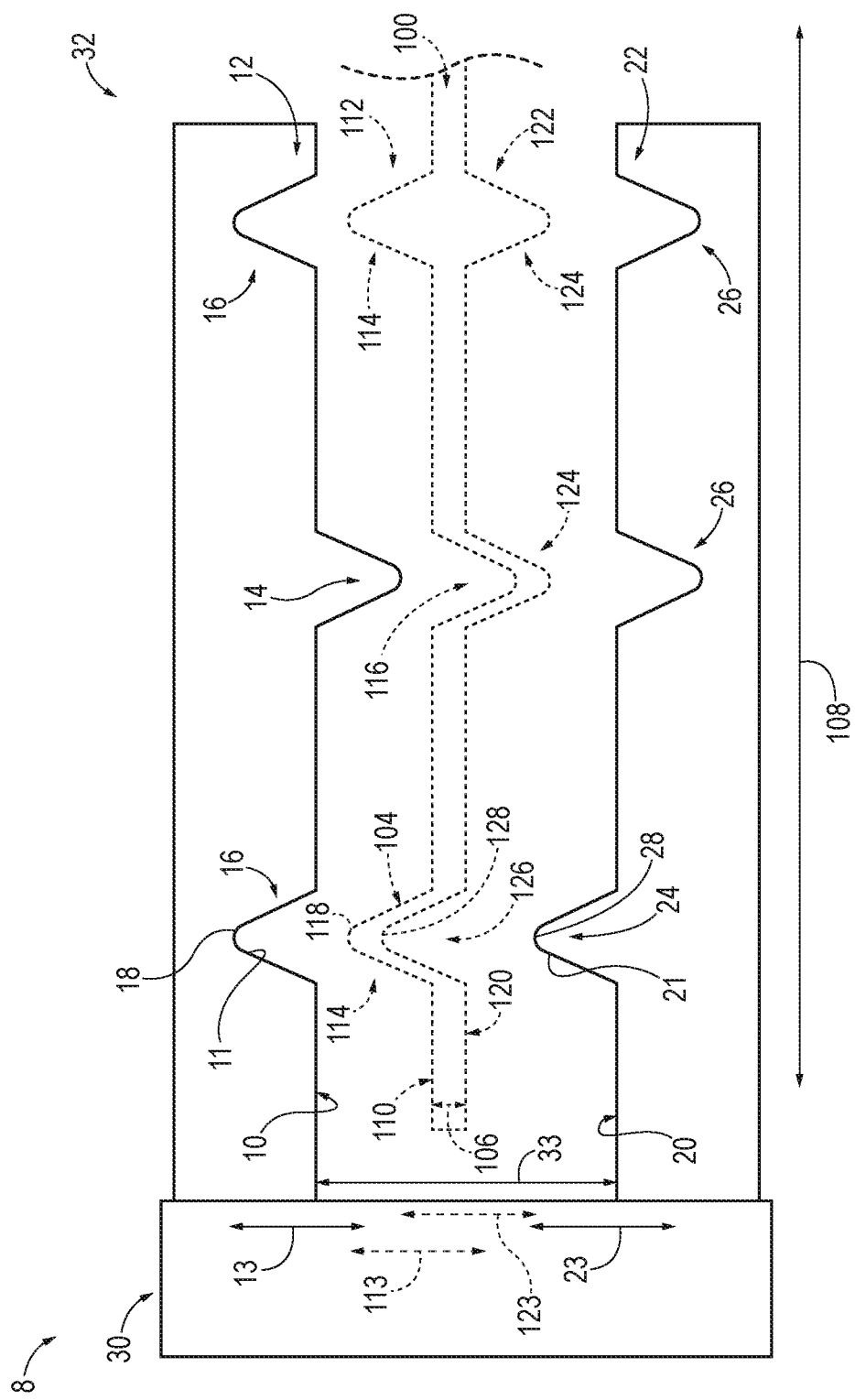
FIG. 1 is a schematic illustration of examples of an end effector in an open orientation, according to the present disclosure.
Figure 2:
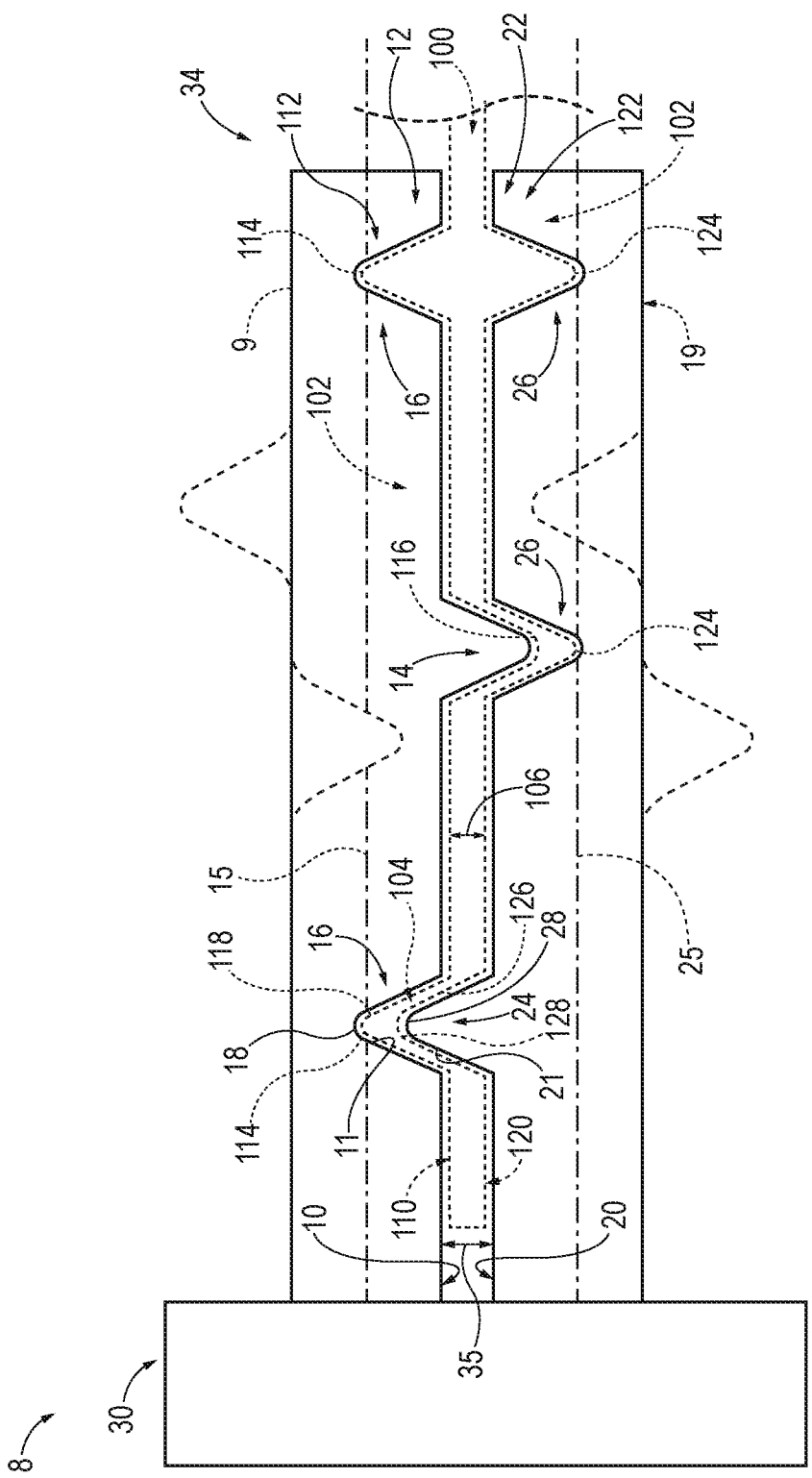
FIG. 2 is a schematic illustration of examples of an end effector in a gripping orientation, according to the present disclosure.
Figure 3:
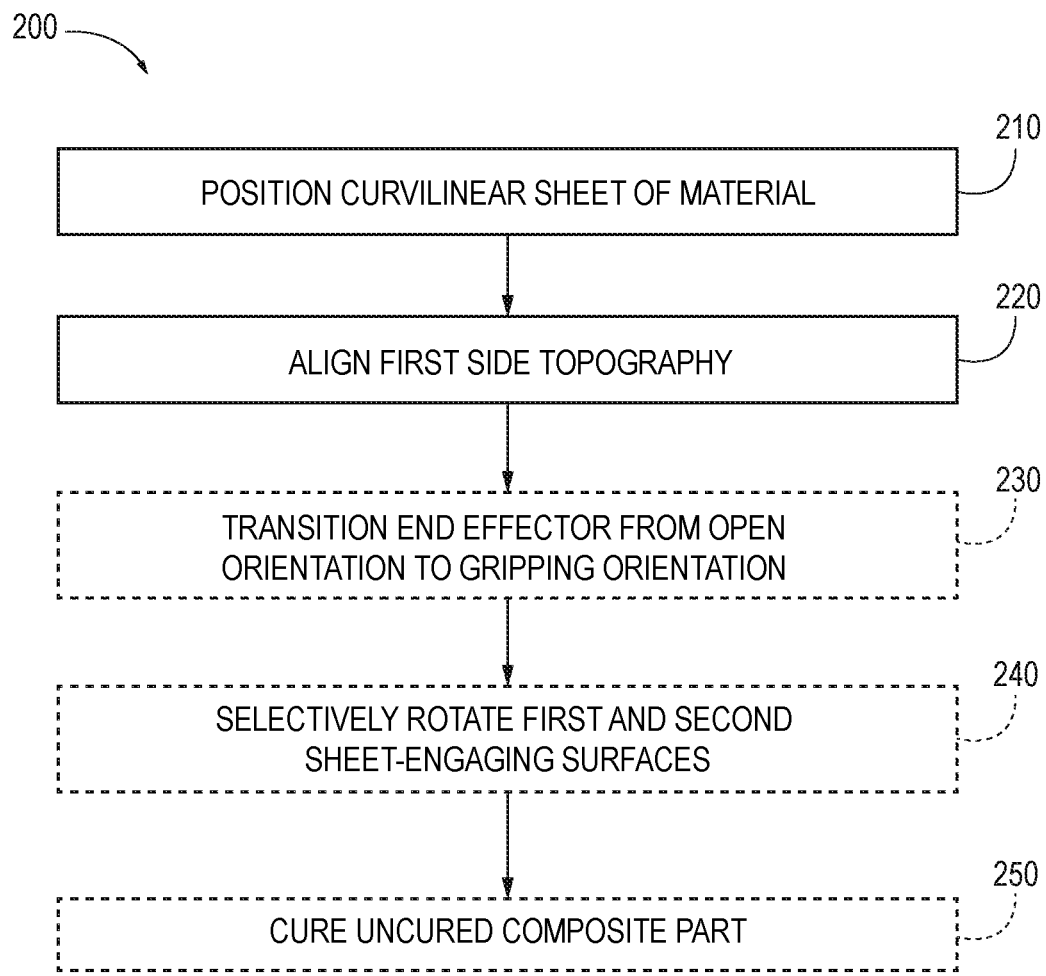
FIG. 3 is a flowchart depicting methods of gripping a curvilinear sheet of material with an end effector, according to the present disclosure.

FIGS. 1-3 provide illustrative, non-exclusive examples of end effectors 8 and/or of methods 200, according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

FIG. 1 is a schematic illustration of examples of an end effector 8 in an open orientation 32, according to the present disclosure, while FIG. 2 is a schematic illustration of examples of end effector 8 in a gripping orientation 34. End effector 8 is configured to selectively grip a curvilinear sheet of material 100 that defines a first sheet side 110 and an opposed second sheet side 120. First sheet side 110 includes, has, and/or defines a curvilinear first side topography 112. Second sheet side 120 similarly may include, have, and/or define a curvilinear second side topography 122. As discussed in more detail herein, end effector 8 may be shaped, sized, designed, and/or constructed to conformally grip and/or support curvilinear sheet of material 100, such as to permit and/or facilitate gripping and/or handling of soft, fragile, thin, and/or compliant curvilinear sheets of material 100, examples of which are disclosed herein. Curvilinear first side topography 112 also may be referred to herein as a first side topography and/or as a periodically repeating first side topography. Similarly, curvilinear second side topography 122 also may be referred to herein as a second side topography and/or as a periodically repeating second side topography.

As illustrated in FIGS. 1-2, end effector 8 includes a first sheet-engaging surface 10, a second sheet-engaging surface 20, and an actuation mechanism 30. First sheet-engaging surface 10 is configured to operatively engage first sheet side 110 and includes a curvilinear first sheet-engaging surface topography 12 that corresponds to first side topography 112. Second sheet-engaging surface 20 is configured to operatively engage second sheet side 120 and may include a curvilinear second sheet-engaging surface topography 22 that corresponds to second side topography 122. Curvilinear first sheet-engaging surface topography 12 also may be referred to herein as a first surface topography and/or as a periodically repeating first sheet-engaging surface topography. Similarly, curvilinear second sheet-engaging surface topography 22, when present, also may be referred to herein as a second surface topography and/or as a periodically repeating second sheet-engaging surface topography.

Actuation mechanism 30 may be configured to change a relative orientation between first sheet-engaging surface 10 and second sheet-engaging surface 20. As an example, actuation mechanism 30 may be configured to selectively transition end effector 8 between open orientation 32, which is illustrated in FIG. 1, and gripping orientation 34, which is illustrated in FIG. 2. When end effector 8 is in open orientation 32, the end effector may be configured to permit curvilinear sheet of material 100 to be positioned between first sheet-engaging surface 10 and second sheet-engaging surface 20. When end effector 8 is in gripping orientation 34, the end effector may be configured to grip curvilinear sheet of material 100 between first sheet-engaging surface 10 and second sheet-engaging surface 20.

As another example, actuation mechanism 30 may be configured to selectively rotate first sheet-engaging surface 10 and second sheet-engaging surface 20 to selectively transfer and/or convey curvilinear sheet of material 100 relative to end effector 8. As a more specific example, and as illustrated in FIG. 2, first sheet-engaging surface 10 may be defined by a first roller 9 that defines a first longitudinal roller axis 15, and second sheet-engaging surface 20 may be defined by a second roller 19 that defines a second longitudinal roller axis 25. In this example, actuation mechanism 30 may be configured to selectively rotate first roller 9 about first longitudinal roller axis 15 and/or to selectively rotate second roller 19 about second longitudinal roller axis 25. As discussed herein, first surface topography 12 may correspond to first side topography 112 and second surface topography 22 may correspond to second side topography 122. With this in mind, actuation mechanism 30 may be configured to synchronize rotation of first roller 9 and/or of second roller 19 such that corresponding regions of first surface topography 12 and/or second surface topography 22 contact and/or interlock with designated and/or complimentary regions of first side topography 112 and/or second side topography 122.

As discussed in more detail herein, when end effector 8 is in gripping orientation 34, first surface topography 12 may selectively and/or separably interlock with and/or support first side topography 112. Additionally or alternatively, second surface topography 22 may selectively and/or separably interlock with and/or support second side topography 122. Such a configuration may permit end effector 8 to grip and/or handle soft, flexible, pliable, thin, and/or fragile curvilinear sheets of material 100.

It is within the scope of the present disclosure that first sheet-engaging surface 10 may have and/or define any suitable first surface topography 12 and/or that second sheet-engaging surface 20 may have and/or define any suitable second surface topography 22. As an example, and as illustrated in FIGS. 1-2, first side topography 112 may include a plurality of first side raised regions 114, which also may be referred to herein as periodically repeating first side raised regions, first side convex regions, and/or first side bumps. In this example, first surface topography 12 may include a plurality of first sheet-engaging surface recessed regions 16, which also may be referred to herein as periodically repeating first sheet-engaging surface recessed regions, first surface recessed regions, first surface concave regions, and/or first surface receptacles. As illustrated in FIG. 2, first surface recessed regions 16 may be shaped, sized, positioned, oriented, and/or configured to receive, or to mate with, first side raised regions 114. Stated another way, a relative orientation of first surface recessed regions 16 may correspond to, or may match, a relative orientation of first side raised regions 114. As such, and as illustrated in FIG. 2, first surface recessed regions 16 and first side raised regions 114 may interlock with one another when end effector 8 is in gripping orientation 34.

As another example, first side topography 112 may include a plurality of first side recessed regions 116, which also may be referred to herein as periodically repeating first side recessed regions, first side concave regions, and/or first side receptacles. In this example, first surface topography 12 may include a plurality of first sheet-engaging surface raised regions 14, which also may be referred to herein as periodically repeating first sheet-engaging surface raised regions, first surface raised regions, first surface convex regions, and/or first surface bumps. As illustrated in FIG. 2, first surface raised regions 14 may be shaped, sized, positioned, oriented, and/or configured to receive, or to mate with, first side recessed regions 116. Stated another way, a relative orientation of first surface raised regions 14 may correspond to, or may match, a relative orientation of first side recessed regions 116. As such, and as illustrated in FIG. 2, first surface raised regions 14 and first side recessed regions 116 may interlock with one another when end effector 8 is in gripping orientation 34.

As yet another example, second side topography 122 may include a plurality of second side raised regions 124, which also may be referred to herein as periodically repeating second side raised regions, second side convex regions, and/or second side bumps. In this example, second surface topography 22 may include a plurality of second sheet-engaging surface recessed regions 26, which also may be referred to herein as periodically repeating second sheet-engaging surface recessed regions, second surface recessed regions, second surface concave regions, and/or second surface receptacles. As illustrated in FIG. 2, second surface recessed regions 26 may be shaped, sized, positioned, oriented, and/or configured to receive, or to mate with, second side raised regions 124. Stated another way, a relative orientation of second surface recessed regions 26 may correspond to, or may match, a relative orientation of second side raised regions 124. As such, and as illustrated in FIG. 2, second surface recessed regions 26 and second side raised regions 124 may interlock with one another when end effector 8 is in gripping orientation 34.

As another example, second side topography 122 may include a plurality of second side recessed regions 126, which also may be referred to herein as periodically repeating second side recessed regions, second side concave regions, and/or second side receptacles. In this example, second surface topography 22 may include a plurality of second sheet-engaging surface raised regions 24, which also may be referred to herein as periodically repeating second sheet-engaging surface raised regions, second surface raised regions, second surface convex regions, and/or second surface bumps. As illustrated in FIG. 2, second surface raised regions 24 may be shaped, sized, positioned, oriented, and/or configured to receive, or to mate with, second side recessed regions 126. Stated another way, a relative orientation of second surface raised regions 24 may correspond to, or may match, a relative orientation of second side recessed regions 126. As such, and as illustrated in FIG. 2, second surface raised regions 24 and second side recessed regions 126 may interlock with one another when end effector 8 is in gripping orientation 34.

In a more specific example, first side topography 112 may include a first side raised region 118 and second side topography 122 may include a second side recessed region 128 that is opposed to the first side raised region. In this example, first surface topography 12 may include a first sheet-engaging surface recessed region 18 that is shaped, sized, and/or positioned to receive, or to mate with, first side raised region 118. In addition, second surface topography 22 may include a second sheet-engaging surface raised region 28 that is shaped, sized, and/or positioned to be received within, or to mate with, second side recessed region 128. Second sheet-engaging surface raised region 28 may face toward first sheet-engaging surface recessed region 18 and/or may extend at least partially into first sheet-engaging surface recessed region 18 when end effector 8 is in gripping orientation 34 of FIG. 2. It is within the scope of the present disclosure that first side raised region 118 and second side recessed region 128 may be defined by the same region 104 of curvilinear sheet of material 100. Stated another way, region 104 that defines first side raised region 118 also may define, may at least partially define, or may completely define, second side recessed region 128. Stated yet another way, second side recessed region 128 may be at least partially, or even completely, defined within first side raised region 118.

It is within the scope of the present disclosure that first sheet-engaging surface 10 of end effector 8 may be sized, shaped, and/or oriented relative to curvilinear sheet of material 100 such that the first sheet-engaging surface contacts, directly contacts, and/or physically contacts a threshold fraction of a total surface area of first sheet side 110. Similarly, second sheet-engaging surface 20 of end effector 8 may be sized, shaped, and/or oriented relative to curvilinear sheet of material 100 such that the second sheet-engaging surface contacts, directly contacts, and/or physically contacts a threshold fraction of a total surface area of second sheet side 120. Examples of the threshold fraction of the total surface area of first sheet side 110 and/or of the threshold fraction of the total surface area of second sheet side 120 include threshold fractions of at least 25%, at least 30%, at least 35%, at least 40%, at least 45%, at least 50%, at least 55%, at least 60%, at least 65%, at least 70%, at least 75%, and/or at least 80%. Additional examples of the threshold fraction of the total surface area of first sheet side 110 and/or of the threshold fraction of the total surface area of second sheet side 120 include threshold fractions of at most 99%, at most 95%, at most 90%, at most 85%, at most 80%, at most 75%, at most 70%, at most 65%, at most 60%, at most 55%, and/or at most 50%. In the above examples, the total surface area of first sheet side 110 may be defined within a region 102 of curvilinear sheet of material 100 that is gripped between first sheet-engaging surface 10 and second sheet-engaging surface 20, as illustrated in FIG. 2. Similarly, the total surface area of second sheet side 120 may be defined within region 102.

Curvilinear sheet of material 100 may include, be, and/or be defined by any suitable material and/or materials. As examples, curvilinear sheet of material 100 may include one or more of a composite material, a thermoplastic material, a thermoset material, and/or a polymeric material. As additional examples, curvilinear sheet of material 100 may include and/or may form a portion of a composite part, a cured composite part, and uncured composite part, and/or an additively manufactured part. As a more specific example, curvilinear sheet of material 100 may be an uncured composite part that is formed on a base layer and subsequently separated from the base layer, such as via dissolution of the base layer in a solvent.

Curvilinear sheet of material 100 may have and/or define any suitable shape. As an example, a cross-section of curvilinear sheet of material 100 may have a curvilinear shape, an arcuate shape, which may comprise a combination of varying curves or even frustoconical shapes, and/or may define a waved layer configuration. The cross-section of the curvilinear sheet of material may have the curvilinear shape relative to a plane that extends through the cross-section of the curvilinear sheet of material, and runs parallel to a length of the curvilinear sheet of material. Similarly, the curvilinear sheet of material may have a curvilinear surface corresponding to the cross-section of the curvilinear sheet of material.

As discussed, curvilinear sheet of material 100 may be thin and/or sheet-like. Stated another way, curvilinear sheet of material 100 may include and/or define a thickness, or an average thickness, 106 that is relatively small, at least when compared to another dimension of the curvilinear sheet of material. Examples of thickness 106 include thicknesses of at least 0.25 millimeters (mm), at least 0.3 mm, at least 0.4 mm, at least 0.5 mm, at least 0.6 mm, at least 0.7 mm, at least 0.8 mm, at least 0.9 mm, at least 1.0 mm, at least 1.1 mm, at least 1.2 mm, at least 1.3 mm, at least 1.4 mm, at least 1.5 mm, at most 5 mm, at most 4.5 mm, at most 4 mm, at most 3.5 mm, at most 3 mm, at most 2.5 mm, at most 2.25 mm, at most 2.0 mm, at most 1.9 mm, at most 1.8 mm, at most 1.7 mm, and/or at most 1.6 mm. Thickness 106 also may control, regulate, be related to, be equal to, and/or be referred to herein as a gripping distance 35 for end effector 8, as illustrated in FIG. 2.

Curvilinear sheet of material 100 may have and/or define an extent, or a maximum extent, 108 that is greater than thickness 106. As examples, a ratio of maximum extent 108 to thickness 106 may be at least 10:1, at least 50:1, at least 100:1, at least 250:1, at least 500:1, at least 1,000:1, at least 2,500:1, at least 5,000:1, at least 10,000:1 at least 50,000:1, at most 1,000,000:1, at most 500,000:1, at most 250,000:1, at most 100,000:1, at most 50,000:1, at most 25,000:1, at most 10,000:1, at most 5,000:1, at most 2,500:1, and/or at most 1,000:1.

First side topography 112 may have and/or define a height 113, which also may be referred to herein as an average height and/or as a root-mean-squared height. Similarly, second side topography 122 may have and/or define a height 123, which also may be referred to herein as an average height 123 and/or as a root-mean-squared height 123. Height 113 and height 123 are illustrated in FIG. 1. It is within the scope of the present disclosure that height 113 and/or height 123 may be greater than thickness 106. As examples, a ratio of height 113 and/or of height 123 to thickness 106 may be at least 2:1, at least 3:1, at least 4:1, at least 5:1, at least 6:1, at least 8:1, at least 10:1, at least 15:1, at least 20:1, at most 50:1, at most 40:1, at most 30:1, at most 20:1, at most 10:1, and/or at most 5:1.

It is within the scope of the present disclosure that a height 13, an average height 13, and/or a root-mean-squared height 13 of first surface topography 12 may be greater than thickness 106.

Similarly, a height 23, an average height 23, and/or a root-mean-squared height 23 of second surface topography 22 may be greater than thickness 106. Height 13 and height 23 are illustrated in FIG. 1. As examples, a ratio of height 13 and/or of height 23 to thickness 106 may be at least 2:1, at least 3:1, at least 4:1, at least 5:1, at least 6:1, at least 8:1, at least 10:1, at least 15:1, at least 20:1, at most 50:1, at most 40:1, at most 30:1, at most 20:1, at most 10:1, and/or at most 5:1.

Actuation mechanism 30 may include any suitable structure that may be adapted and/or configured to selectively transition end effector 8 between open orientation 32 of FIG.

1 and gripping orientation 34 of FIG. 2. Additionally or alternatively, actuation mechanism 30 may include any suitable structure that may be adapted and/or configured to selectively rotate first sheet-engaging surface 10 and second sheet-engaging surface 20 to selectively convey curvilinear sheet of material 100 relative to end effector 8. As examples, actuation mechanism 30 may include a mechanical actuation mechanism, an electrical actuation mechanism, a hydraulic actuation mechanism, a pneumatic actuation mechanism, an actuator, a linear actuator, a pneumatic actuator, a pneumatic cylinder, a hydraulic actuator, a hydraulic cylinder, a motor, an electric motor, a stepper motor, and/or a rotary motor.

It is within the scope of the present disclosure that, when end effector 8 is in gripping orientation 34 of FIG. 2 and/or when the end effector selectively conveys curvilinear sheet of material 100 relative thereto, first sheet-engaging surface 10 may be parallel, or at least substantially parallel, to second sheet-engaging surface 20. Additionally or alternatively, a given region of first sheet-engaging surface 10, such as a portion of the first sheet-engaging surface that contacts curvilinear sheet of material 100, may be parallel, or at least substantially parallel, to a corresponding, opposed, region of second sheet-engaging surface 20, such as a portion of the second sheet-engaging surface that contacts the curvilinear sheet of material. Such a configuration may permit and/or facilitate gripping and/or conveyance of curvilinear sheet of material 100 by end effector 8.

When end effector 8 is in gripping orientation 34 of FIG. 2 and grips curvilinear sheet of material 100, the end effector may compress at least a region 102 of the curvilinear sheet of material between a corresponding region 11 of first sheet-engaging surface 10 and a corresponding region 21 of second sheet-engaging surface 20. Such a configuration may permit and/or facilitate reproducible and/or reliable gripping and/or conveyance of curvilinear sheet of material 100 by end effector 8.

It is within the scope of the present disclosure that, when end effector 8 is in gripping orientation 34 of FIG. 2, the end effector may define gripping distance 35, which also may be referred to herein as an average gripping distance, between first sheet-engaging surface 10 and second sheet-engaging surface 20. Conversely, when end effector 8 is in open orientation 32 of FIG. 1, the end effector may define an open distance 33, which also may be referred to herein as an average open distance, between first sheet-engaging surface 10 and second sheet-engaging surface 20.

Open distance 33 may be greater than gripping distance 35. As an example, open distance 33 may be at least a threshold multiple of gripping distance 35. Examples of the threshold multiple include threshold multiples of at least 2, at least 4, at least 6, at least 8, at least 10, at least 15, at least 20, at least 30, at least 40, and/or at least 50.

FIG. 3 is a flowchart depicting methods 200, according to the present disclosure, of gripping a curvilinear sheet of material, such as curvilinear sheet of material 100 of FIGS. 1-2, with an end effector, such as end effector 8 of FIGS. 1-2. Methods 200 include positioning the curvilinear sheet of material at 210 and aligning a curvilinear first side topography at 220. Methods 200 also may include transitioning the end effector from an open orientation to a gripping orientation at 230, selectively rotating a first sheet-engaging surface and a second sheet-engaging surface at 240, and/or curing an uncured composite part at 250.

Positioning the curvilinear sheet of material at 210 may include positioning the curvilinear sheet of material between the first sheet-engaging surface and the second sheet-engaging surface of the end effector. The positioning at 210 may be performed with any suitable timing and/or sequence during methods 200. As examples, the positioning at 210 may be performed prior to the aligning at 220, prior to the transitioning at 230, prior to the selectively rotating at 240, and/or prior to the curing at 250. When methods 200 include the transitioning at 230, the positioning at 210 may include positioning while the end effector is in the open orientation.

Examples of the first sheet-engaging surface are disclosed herein with reference to first sheet-engaging surface 10 of FIGS. 1-2. Examples of the second sheet-engaging surface are disclosed herein with reference to second sheet-engaging surface 20 of FIGS. 1-2.

Aligning the curvilinear first side topography at 220 may include aligning a curvilinear first side topography of the curvilinear sheet of material with a curvilinear first sheet-engaging surface topography of the first sheet-engaging surface. Additionally or alternatively, the aligning at 220 may include aligning a curvilinear second side topography of the curvilinear sheet of material with a curvilinear second sheet-engaging surface topography of the second sheet-engaging surface.

Examples of the curvilinear first side topography are disclosed herein with reference to curvilinear first side topography 112 of FIGS. 1-2. Examples of the curvilinear first sheet-engaging surface topography are disclosed herein with reference to curvilinear first sheet-engaging surface topography 12 of FIGS. 1-2. Examples of the curvilinear second side topography are disclosed herein with reference to curvilinear second side topography 122 of FIGS. 1-2. Examples of the curvilinear second sheet-engaging surface topography are disclosed herein with reference to curvilinear second sheet-engaging surface topography 22 of FIGS. 1-2.

Transitioning the end effector from the open orientation to the gripping orientation at 230 may include transitioning to grip the curvilinear sheet of material between the first sheet-engaging surface and the second sheet-engaging surface. This may include compressing at least a region of the curvilinear sheet of material between the first sheet-engaging surface and the second sheet-engaging surface. Additionally or alternatively, the transitioning at 230 may include directly and/or physically supporting a threshold fraction of a total surface area of the first sheet side of the curvilinear sheet of material with the first sheet-engaging surface and/or directly and physically supporting a threshold fraction of a total surface area of the second sheet side of the curvilinear sheet of material with the second sheet-engaging surface.

Examples of the threshold fraction of the total surface area of the first sheet side and/or of the threshold fraction of the total surface area of the second sheet side are disclosed herein. Examples of the total surface area of the first sheet side of the curvilinear sheet of material and/or of the total surface area of the second sheet side of the curvilinear sheet of material are disclosed herein. Examples of the opening orientation are disclosed herein with reference to open orientation 32 of FIG. 1. Examples of the gripping orientation are disclosed herein with reference to gripping orientation 34 of FIG. 2.

It is within the scope of the present disclosure that the transitioning at 230 may include selectively and separably interlocking the curvilinear first side topography with the curvilinear first sheet-engaging surface topography. Additionally or alternatively, the transitioning at 230 may include selectively and separably interlocking the curvilinear second side topography with the curvilinear second sheet-engaging surface topography.

The transitioning at 230 may be accomplished in any suitable manner. As an example, the transitioning at 230 may include moving one of the first sheet-engaging surface and the second sheet-engaging surface toward the other of the first sheet-engaging surface and the second sheet-engaging surface. As another example, the transitioning at 230 may include transitioning with, via, and/or utilizing an actuation mechanism, such as actuation mechanism 30 of FIGS. 1-2.

Selectively rotating the first sheet-engaging surface and the second sheet-engaging surface at 240 may include selectively rotating to selectively convey the curvilinear sheet of material relative to the end effector. The selectively rotating at 240 may be accomplished in any suitable manner. As an example, the selectively rotating at 240 may be performed with, via, and/or utilizing the actuation mechanism. As another example the first sheet-engaging surface may be formed and/or defined on a first roller that defines a first longitudinal roller axis. Similarly, the second sheet-engaging surface may be formed and/or defined on a second roller that defines a second longitudinal roller axis. Under these conditions, the selectively rotating at 240 may include selectively rotating the first roller about the first longitudinal roller axis and also selectively rotating the second roller about the second longitudinal roller axis. Examples of the first roller are disclosed herein with reference to first roller 9 of FIG. 2. Examples of the second roller are disclosed herein with reference to second roller 19 of FIG. 2.

In some examples, the curvilinear sheet of material may include and/or be an uncured composite part. In these examples, methods 200 further may include curing the uncured composite part at 250. The curing at 250 may include supporting the uncured composite part, with the end effector, during the curing at 250. The supporting may include supporting the curvilinear first side topography of the curvilinear sheet of material with the curvilinear first sheet-engaging surface topography of the first sheet-engaging surface. Additionally or alternatively, the supporting may include supporting the curvilinear second side topography of the curvilinear sheet of material with the curvilinear second sheet-engaging surface topography of the second sheet-engaging surface.

It is within the scope of the present disclosure that the supporting may include supporting to maintain a desired shape for the curvilinear first side topography and/or for the curvilinear second side topography subsequent to the curing at 250. Additionally or alternatively, the supporting may include supporting to produce and/or to generate the desired shape for the curvilinear first side topography and/or for the curvilinear second side topography subsequent to the curing at 250.

Illustrative, non-exclusive examples of inventive subject matter according to the present disclosure are described in the following enumerated paragraphs:

A1. An end effector (8) configured to selectively grip a curvilinear sheet of material (100), wherein the curvilinear sheet of material defines a first sheet side (110) having a curvilinear first side topography (112) and an opposed second sheet side (120) optionally having a curvilinear second side topography (122), the end effector comprising:

a first sheet-engaging surface (10) configured to operatively engage the first sheet side and having a curvilinear first sheet-engaging surface topography (12) that corresponds to the curvilinear first side topography;

a second sheet-engaging surface (20) configured to operatively engage the second sheet side and optionally having a curvilinear second sheet-engaging surface topography (22) that corresponds to the curvilinear second side topography; and an actuation mechanism (30), optionally wherein the actuation mechanism is at least one of:

(i) configured to selectively transition the end effector between an open orientation (32) in which the end effector is configured to permit the curvilinear sheet of material to be positioned between the first sheet-engaging surface and the second sheet-engaging surface and a gripping orientation (34) in which the end effector is configured to grip the curvilinear sheet of material between the first sheet-engaging surface and the second sheet-engaging surface; and (ii) configured to selectively rotate the first sheet-engaging surface and the second sheet-engaging surface to selectively convey the curvilinear sheet of material relative to the end effector.

A2. The end effector of paragraph A1, wherein at least one of:

(i) the curvilinear first side topography includes a plurality of first side raised regions (114); and (ii) the curvilinear first sheet-engaging surface topography includes a plurality of first sheet-engaging surface recessed regions (16), optionally wherein each first sheet-engaging surface recessed region in the plurality of first sheet-engaging surface recessed regions is configured to receive, or to mate with, a corresponding first side raised region in the plurality of first side raised regions, and further optionally wherein a relative orientation of the plurality of first sheet-engaging surface recessed regions corresponds to, or matches, a relative orientation of the plurality of first side raised regions.

A3. The end effector of any of paragraphs A1-A2, wherein at least one of:

(i) the curvilinear first side topography includes a plurality of first side recessed regions (116); and (ii) the curvilinear first sheet-engaging surface topography includes a plurality of first sheet-engaging surface raised regions (14), optionally wherein each first sheet-engaging surface raised region in the plurality of first sheet-engaging surface raised regions is configured to be received within, or to mate with, a corresponding first side recessed region in the plurality of first side recessed regions, and further optionally wherein a relative orientation of the plurality of first sheet-engaging surface recessed raised regions corresponds to, or matches, a relative orientation of the plurality of first side recessed regions.

A4. The end effector of any of paragraphs A1-A3, wherein the first sheet-engaging surface is shaped to directly and physically contact a threshold fraction of a total surface area of the first sheet side, optionally wherein the threshold fraction of the total surface area of the first sheet side is at least one of:

(i) at least 25%, at least 30%, at least 35%, at least 40%, at least 45%, at least 50%, at least 55%, at least 60%, at least 65%, at least 70%, at least 75%, or at least 80% of the total surface area of the first sheet side; and (ii) at most 99%, at most 95%, at most 90%, at most 85%, at most 80%, at most 75%, at most 70%, at most 65%, at most 60%, at most 55%, or at most 50% of the total surface area of the first sheet side.

A5. The end effector of paragraph A4, wherein the total surface area of the first sheet side is defined by a region (102) of the curvilinear sheet of material that is gripped between the first sheet-engaging surface and second sheet-engaging surface.

A6. The end effector of any of paragraphs A1-A5, wherein the curvilinear first sheet-engaging surface topography is shaped to selectively and separably interlock with the curvilinear first side topography.

A7. The end effector of any of paragraphs A1-A6, wherein at least one of:

(i) the curvilinear second side topography includes a plurality of second side raised regions (124); and (ii) the curvilinear second sheet-engaging surface topography includes a plurality of second sheet-engaging surface recessed regions (26), optionally wherein each second sheet-engaging surface recessed region in the plurality of second sheet-engaging surface recessed regions is configured to receive, or to mate with, a corresponding second side raised region in the plurality of second side raised regions, and further optionally wherein a relative orientation of the plurality of second sheet-engaging surface recessed regions corresponds to, or matches, a relative orientation of the plurality of second side raised regions.

A8. The end effector of any of paragraphs A1-A7, wherein at least one of:

(i) the curvilinear second side topography includes a plurality of second side recessed regions (126); and (ii) the curvilinear second sheet-engaging surface topography includes a plurality of second sheet-engaging surface raised regions (24), optionally wherein each second sheet-engaging surface raised region in the plurality of second sheet-engaging surface raised regions is configured to be received within, or to mate with, a corresponding second side recessed region in the plurality of second side recessed regions, and further optionally wherein a relative orientation of the plurality of second sheet-engaging surface recessed raised regions corresponds to, or matches, a relative orientation of the plurality of second side recessed regions.

A9. The end effector of any of paragraphs A1-A8, wherein the second sheet-engaging surface is shaped to directly and physically contact a threshold fraction of a total surface area of the second sheet side, optionally wherein the threshold fraction of the total surface area of the second sheet side is at least one of:

(i) at least 25%, at least 30%, at least 35%, at least 40%, at least 45%, at least 50%, at least 55%, at least 60%, at least 65%, at least 70%, at least 75%, or at least 80% of the total surface area of the second sheet side; and at most 99%, at most 95%, at most 90%, at most 85%, at most 80%, at most 75%, at most 70%, at most 65%, at most 60%, at most 55%, or at most 50% of the total surface area of the second sheet side.

A10. The end effector of paragraph A9, wherein the total surface area of the second sheet side is defined by a/the region of the curvilinear sheet of material that is gripped between the first sheet-engaging surface and second sheet-engaging surface.

A11. The end effector of any of paragraphs A1-A10, wherein the curvilinear second sheet-engaging surface topography is shaped to selectively and separably interlock with the curvilinear second side topography.

b 12. The end effector of any of paragraphs A1-A11, wherein the end effector further includes the curvilinear sheet of material.

A13. The end effector of any of paragraphs A1-A12, wherein:

(i) the curvilinear first side topography includes a first side raised region (118);

(ii) the curvilinear second side topography includes a second side recessed region (128) that is opposed to the first side raised region;

(iii) the curvilinear first sheet-engaging surface topography includes a first sheet-engaging surface recessed region (18) shaped to receive, or to mate with, the first side raised region; and (iv) the curvilinear second sheet-engaging surface topography includes a second sheet-engaging surface raised region (28) shaped to be received within, or to mate with, the second side recessed region.

A14. The end effector of paragraph A13, wherein the second sheet-engaging surface raised region at least one of:

(i) faces toward the first sheet-engaging surface recessed region; and (ii) extends at least partially into the first sheet-engaging surface recessed region when the end effector is in the gripping orientation.

A15. The end effector of any of paragraphs A13-A14, wherein a region (104) of the curvilinear sheet of material that defines the first side raised region also at least partially, or completely, defines the second side recessed region.

A16. The end effector of any of paragraphs A13-A15, wherein the second side recessed region is at least partially, or completely, defined within the first side raised region.

A17. The end effector of any of paragraphs A1-A16, wherein a thickness (106), or an average thickness, of the curvilinear sheet of material, as measured between the first sheet side and the second sheet side, is at least one of:

(i) at least 0.25 millimeters (mm), at least 0.3 mm, at least 0.4 mm, at least 0.5 mm, at least 0.6 mm, at least 0.7 mm, at least 0.8 mm, at least 0.9 mm, at least 1.0 mm, at least 1.1 mm, at least 1.2 mm, at least 1.3 mm, at least 1.4 mm, or at least 1.5 mm; and (ii) at most 5 mm, at most 4.5 mm, at most 4 mm, at most 3.5 mm, at most 3 mm, at most 2.5 mm, at most 2.25 mm, at most 2.0 mm. at most 1.9 mm, at most 1.8 mm, at most 1.7 mm, or at most 1.6 mm.

A18. The end effector of any of paragraphs A1-A17, wherein a ratio of a height (13), or a root-mean-squared height, of the curvilinear first sheet-engaging surface topography to a/the thickness, or an/the average thickness, of the curvilinear sheet of material is at least one of:

(i) at least 2:1, at least 3:1, at least 4:1, at least 5:1, at least 6:1, at least 8:1, at least 10:1, at least 15:1, or at least 20:1; and (ii) at most 50:1, at most 40:1, at most 30:1, at most 20:1, at most 10:1, or at most 5:1.

A19. The end effector of any of paragraphs A1-A18, wherein a ratio of a height (23), or a root-mean-squared height, of the curvilinear second sheet-engaging surface topography to a/the thickness, or an/the average thickness, of the curvilinear sheet of material is at least one of:

(i) at least 2:1, at least 3:1, at least 4:1, at least 5:1, at least 6:1, at least 8:1, at least 10:1, at least 15:1, or at least 20:1; and (ii) at most 50:1, at most 40:1, at most 30:1, at most 20:1, at most 10:1, or at most 5:1.

A20. The end effector of any of paragraphs A1-A19, wherein a ratio of a height (113), or a root-mean-squared height, of the curvilinear first side topography to a/the thickness, or an/the average thickness, of the curvilinear sheet of material is at least one of:

(i) at least 2:1, at least 3:1, at least 4:1, at least 5:1, at least 6:1, at least 8:1, at least 10:1, at least 15:1, or at least 20:1; and (ii) at most 50:1, at most 40:1, at most 30:1, at most 20:1, at most 10:1, or at most 5:1.

A21. The end effector of any of paragraphs A1-A20, wherein a ratio of a height (123), or a root-mean-squared height, of the curvilinear second side topography to a/the thickness, or an/the average thickness, of the curvilinear sheet of material is at least one of:

(i) at least 2:1, at least 3:1, at least 4:1, at least 5:1, at least 6:1, at least 8:1, at least 10:1, at least 15:1, or at least 20:1; and (ii) at most 50:1, at most 40:1, at most 30:1, at most 20:1, at most 10:1, or at most 5:1.

A22. The end effector of any of paragraphs A1-A21, wherein a ratio of a maximum extent (108) of the curvilinear sheet of material to a/the thickness, or an/the average thickness, of the curvilinear sheet of material is at least one of:

(i) at least 10:1, at least 50:1, at least 100:1, at least 250:1, at least 500:1, at least 1,000:1, at least 2,500:1, at least 5,000:1, at least 10,000:1 or at least 50,000:1; and (ii) at most 1,000,000:1, at most 500,000:1, at most 250,000:1, at most 100,000:1, at most 50,000:1, at most 25,000:1, at most 10,000:1, at most 5,000:1, at most 2,500:1, or at most 1,000:1.

A23. The end effector of any of paragraphs A1-A22, wherein, when in end effector is in the gripping orientation, at least one of:

(i) the first sheet-engaging surface is parallel, or at least substantially parallel, to the second sheet-engaging surface; and (ii) a given region of the first sheet-engaging surface is parallel, or at least substantially parallel, to a corresponding, opposed, region of the second sheet-engaging surface.

A24. The end effector of any of paragraphs A1-A23, wherein, when the end effector is in the gripping orientation and grips the curvilinear sheet of material, the end effector compresses at least a region (102) of the curvilinear sheet of material between a corresponding region (11) of the first sheet-engaging surface and a corresponding region (21) of the second sheet-engaging surface.

A25. The end effector of any of paragraphs A1-A24, wherein:

(i) when the end effector is in the gripping orientation, the end effector defines a gripping distance (35), or an average gripping distance, between the first sheet-engaging surface and the second sheet-engaging surface;

(ii) when the end effector is in the open orientation, the end effector defines an open distance (33), or an average open distance, between the first sheet-engaging surface and the second sheet-engaging surface; and (iii) the open distance, or the average open distance, is greater than the gripping distance, or the average gripping distance, optionally wherein the open distance, or the average open distance, is at least a threshold multiple of the gripping distance, or the average gripping distance, and further optionally wherein the threshold multiple is at least 2, at least 4, at least 6, at least 8, at least 10, at least 15, at least 20, at least 30, at least 40, or at least 50.

A26. The end effector of any of paragraphs A1-A25, wherein the actuation mechanism includes at least one of a mechanical actuation mechanism, an electrical actuation mechanism, a hydraulic actuation mechanism, a pneumatic actuation mechanism, a motor, an electric motor, a hydraulic cylinder, and a pneumatic cylinder.

A27. The end effector of any of paragraphs A1-A26, wherein the first sheet-engaging surface is defined on a first roller that defines a first longitudinal roller axis, wherein the second sheet-engaging surface is defined on a second roller, that defines a second longitudinal roller axis, and further wherein the actuation mechanism is configured to selectively rotate the first roller about the first longitudinal roller axis and also to selectively rotate the second roller about the second longitudinal roller axis.

B1. A method of gripping a curvilinear sheet of material with an end effector, the method comprising:

positioning, optionally while the end effector is in an open orientation, the curvilinear sheet of material between a first sheet-engaging surface of the end effector and a second sheet-engaging surface of the end effector;

aligning a curvilinear first side topography of the curvilinear sheet of material with a curvilinear first sheet-engaging surface topography of the first sheet-engaging surface; and at least one of:

(i) transitioning the end effector from the open orientation to a gripping orientation to grip the curvilinear sheet of material between the first sheet-engaging surface and the second sheet-engaging surface; and (ii) selectively rotating the first sheet-engaging surface and the second sheet-engaging surface to selectively convey the curvilinear sheet of material relative to the end effector.

B2. The method of paragraph B1, wherein the transitioning includes compressing at least a region of the curvilinear sheet of material between the first sheet-engaging surface and the second sheet-engaging surface.

B3. The method of any of paragraphs B1-B2, wherein the transitioning includes directly and physically supporting a threshold fraction of a total surface area of the first sheet side of the curvilinear sheet of material with the first sheet-engaging surface.

B4. The method of paragraph B3, wherein the threshold fraction of the total surface area of the first sheet side of the curvilinear sheet of material is at least one of:

(i) at least 25%, at least 30%, at least 35%, at least 40%, at least 45%, at least 50%, at least 55%, at least 60%, at least 65%, at least 70%, at least 75%, or at least 80% of the total surface area of the first sheet side; and (ii) at most 99%, at most 95%, at most 90%, at most 85%, at most 80%, at most 75%, at most 70%, at most 65%, at most 60%, at most 55%, or at most 50% of the total surface area of the first sheet side.

B5. The method of paragraph B4, wherein the total surface area of the first sheet side is defined by a region of the curvilinear sheet of material that is gripped between the first sheet-engaging surface and second sheet-engaging surface.

B6. The method of any of paragraphs B1-B5, wherein the transitioning includes directly and physically supporting at least a threshold fraction of a total surface area of the second sheet side of the curvilinear sheet of material with the second sheet-engaging surface.

B7. The method of paragraph B6, wherein the threshold fraction of the total surface area of the second sheet side of the curvilinear sheet of material is at least one of:

(i) at least 25%, at least 30%, at least 35%, at least 40%, at least 45%, at least 50%, at least 55%, at least 60%, at least 65%, at least 70%, at least 75%, or at least 80% of the total surface area of the second sheet side; and (ii) at most 99%, at most 95%, at most 90%, at most 85%, at most 80%, at most 75%, at most 70%, at most 65%, at most 60%, at most 55%, or at most 50% of the total surface area of the second sheet side.

B8. The method of paragraph B7, wherein the total surface area of the second sheet side is defined by a/the region of the curvilinear sheet of material that is gripped between the first sheet-engaging surface and second sheet-engaging surface.

B9. The method of any of paragraphs B1-B8, wherein the transitioning includes at least one of:

(i) selectively and separably interlocking the curvilinear first side topography with the curvilinear first sheet-engaging surface topography; and (ii) selectively and separably interlocking a curvilinear second side topography of the curvilinear sheet of material with a second sheet-engaging surface topography of the second sheet-engaging surface.

B10. The method of any of paragraphs B1-B9, wherein the end effector includes any suitable structure of any of the end effectors of any of paragraphs A1-A27.

B11. The method of any of paragraphs B1-B10, wherein the curvilinear sheet of material includes any suitable structure of any of the curvilinear sheets of material described with respect to any of paragraphs A1-A27.

B12. The method of any of paragraphs B1-B11, wherein the curvilinear sheet of material includes, or is, an uncured composite part, wherein the method further includes curing the uncured composite part, and further wherein the method includes supporting the curvilinear first side topography of the curvilinear sheet of material with the curvilinear first sheet-engaging surface topography of the first sheet-engaging surface, during the curing, optionally to at least one of:

(i) maintain a desired shape for the curvilinear first side topography subsequent to the curing; and (ii) produce the desired shape for the curvilinear first side topography subsequent to the curing.

B13. The method of any of paragraphs B1-B12, wherein the first sheet-engaging surface is defined on a first roller that defines a first longitudinal roller axis, wherein the second sheet-engaging surface is defined on a second roller, that defines a second longitudinal roller axis, and further wherein the selectively rotating includes selectively rotating the first roller about the first longitudinal roller axis and also selectively rotating the second roller about the second longitudinal roller axis.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. An end effector configured to selectively grip a curvilinear sheet of material, wherein the curvilinear sheet of material defines a first sheet side having a curvilinear first side topography and an opposed second sheet side having a curvilinear second side topography, the end effector comprising:

a first sheet-engaging surface configured to operatively engage the first sheet side and having a curvilinear first sheet-engaging surface topography that corresponds to the curvilinear first side topography;

a second sheet-engaging surface configured to operatively engage the second sheet side and having a curvilinear second sheet-engaging surface topography that corresponds to the curvilinear second side topography;

an actuation mechanism configured to selectively transition the end effector between an open orientation in which the end effector is configured to permit the curvilinear sheet of material to be positioned between the first sheet-engaging surface and the second sheet-engaging surface and a gripping orientation in which the end effector is configured to grip the curvilinear sheet of material between the first sheet-engaging surface and the second sheet-engaging surface; and the curvilinear sheet of material, wherein:
(i) the curvilinear first side topography includes a first side raised region;
(ii) the curvilinear second side topography includes a second side recessed region that is opposed to the first side raised region;
(iii) the curvilinear first sheet-engaging surface topography includes a first sheet-engaging surface recessed region shaped to receive the first side raised region;
(iv) the curvilinear second sheet-engaging surface topography includes a second sheet-engaging surface raised region shaped to be received within the second side recessed region; and
(v) wherein, when the end effector selectively grips the curvilinear sheet of material, the second sheet-engaging surface raised region is at least partially received within the first sheet-engaging surface recessed region.

2. The end effector of claim 1, wherein:
(i) the curvilinear first side topography includes a plurality of first side raised regions; and
(ii) the curvilinear first sheet-engaging surface topography includes a plurality of first sheet-engaging surface recessed regions.

3. The end effector of claim 2, wherein each first sheet-engaging surface recessed region in the plurality of first sheet-engaging surface recessed regions is configured to receive a corresponding first side raised region in the plurality of first side raised regions.

4. The end effector of claim 2, wherein a relative orientation of the plurality of first sheet-engaging surface recessed regions corresponds to a relative orientation of the plurality of first side raised regions.

5. The end effector of claim 1, wherein the first sheet-engaging surface is shaped to directly and physically contact at least 25% of a total surface area of the first sheet side.

6. The end effector of claim 5, wherein the total surface area of the first sheet side is defined by a region of the curvilinear sheet of material that is gripped between the first sheet-engaging surface and second sheet-engaging surface.

7. The end effector of claim 1, wherein the second sheet-engaging surface is shaped to directly and physically contact at least 25% of a total surface area of the second sheet side.

8. The end effector of claim 1, wherein a ratio of a height of the curvilinear first sheet-engaging surface topography to a thickness of the curvilinear sheet of material is at least 2:1 and at most 50:1.

9. The end effector of claim 1, wherein a ratio of a height of the curvilinear second sheet-engaging surface topography to a thickness of the curvilinear sheet of material is at least 2:1 and at most 50:1.

10. The end effector of claim 1, wherein:
(i) when the end effector is in the gripping orientation, the end effector defines a gripping distance between the first sheet-engaging surface and the second sheet-engaging surface;
(ii) when the end effector is in the open orientation, the end effector defines an open distance between the first sheet-engaging surface and the second sheet-engaging surface; and
(iii) the open distance is at least 4 times larger than the gripping distance.

11. A method of gripping a curvilinear sheet of material with an end effector, the method comprising:
positioning, while the end effector is in an open orientation, the curvilinear sheet of material between a first sheet-engaging surface of the end effector and a second sheet-engaging surface of the end effector;
aligning a curvilinear first side topography of the curvilinear sheet of material with a curvilinear first sheet-engaging surface topography of the first sheet-engaging surface; and
transitioning the end effector from the open orientation to a gripping orientation to grip the curvilinear sheet of material between the first sheet-engaging surface and the second sheet-engaging surface.

12. The method of claim 11, wherein the transitioning includes compressing at least a region of the curvilinear sheet of material between the first sheet-engaging surface and the second sheet-engaging surface.

13. The method of claim 11, wherein the transitioning includes directly and physically supporting at least a threshold fraction of a total surface area of a first sheet side of the curvilinear sheet of material with the first sheet-engaging surface.

14. The method of claim 13, wherein the threshold fraction of the total surface area of the first sheet side of the curvilinear sheet of material is at least 25% of the total surface area of the first sheet side.

15. The method of claim 13, wherein the total surface area of the first sheet side is defined by a region of the curvilinear sheet of material that is gripped between the first sheet-engaging surface and second sheet-engaging surface.

16. The method of claim 13, wherein the transitioning includes directly and physically supporting at least a threshold fraction of a total surface area of a second sheet side of the curvilinear sheet of material with the second sheet-engaging surface.

17. The method of claim 16, wherein the threshold fraction of the total surface area of the second sheet side of the curvilinear sheet of material is at least 25% of the total surface area of the second sheet side.

18. The method of claim 16, wherein the total surface area of the second sheet side is defined by a region of the curvilinear sheet of material that is gripped between the first sheet-engaging surface and second sheet-engaging surface.

19. The method of claim 11, wherein the transitioning includes at least one of:
(i) selectively and separably interlocking the curvilinear first side topography with the curvilinear first sheet-engaging surface topography; and
(ii) selectively and separably interlocking a curvilinear second side topography of the curvilinear sheet of material with a second sheet-engaging surface topography of the second sheet-engaging surface.

* * * * *